July 26, 1960 J. D. BOZZA 2,946,069
METHOD OF MANUFACTURING MOCCASINS
Filed Dec. 17, 1956 4 Sheets-Sheet 1
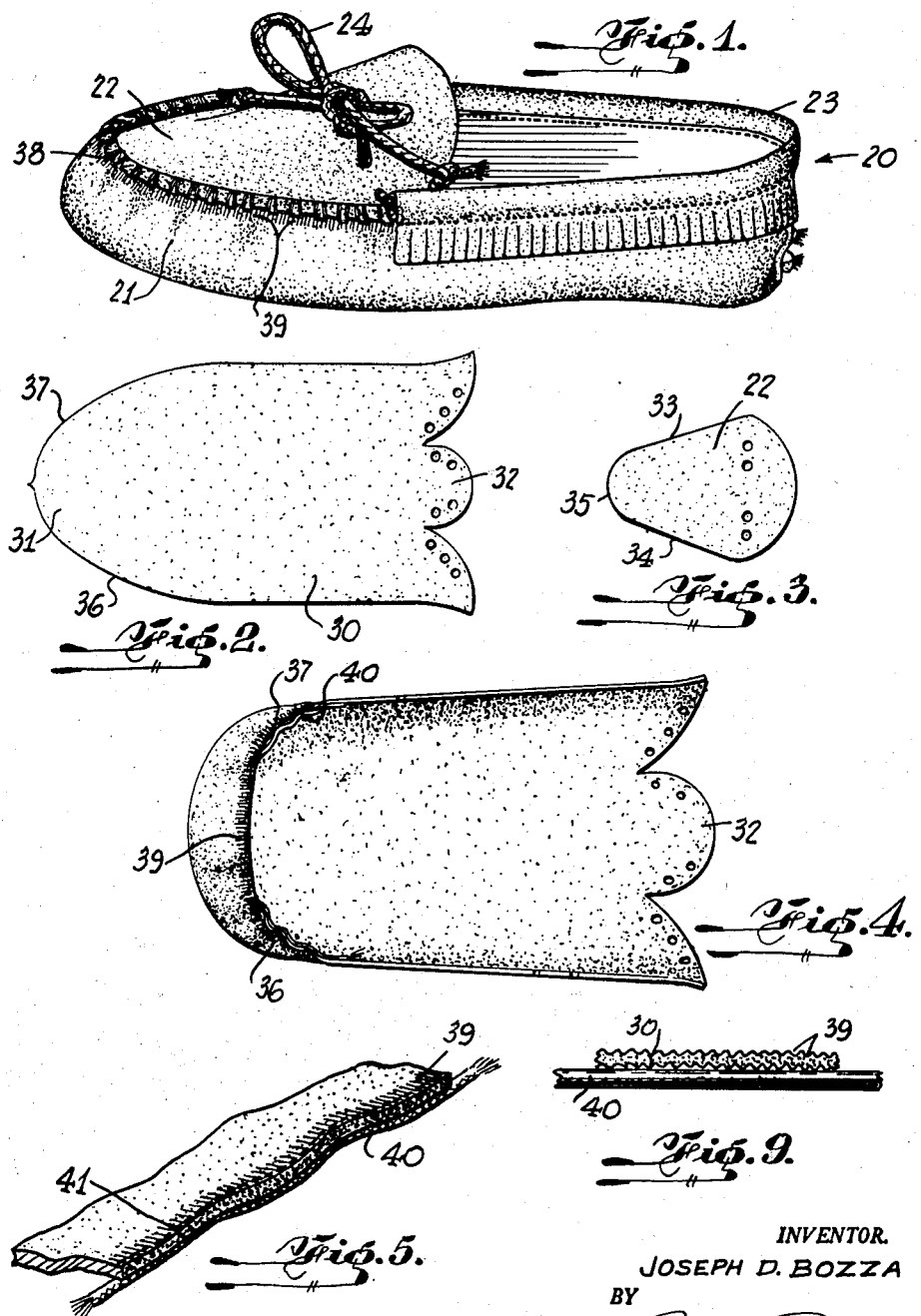
INVENTOR.
JOSEPH D. BOZZA
BY
ATTORNEYS

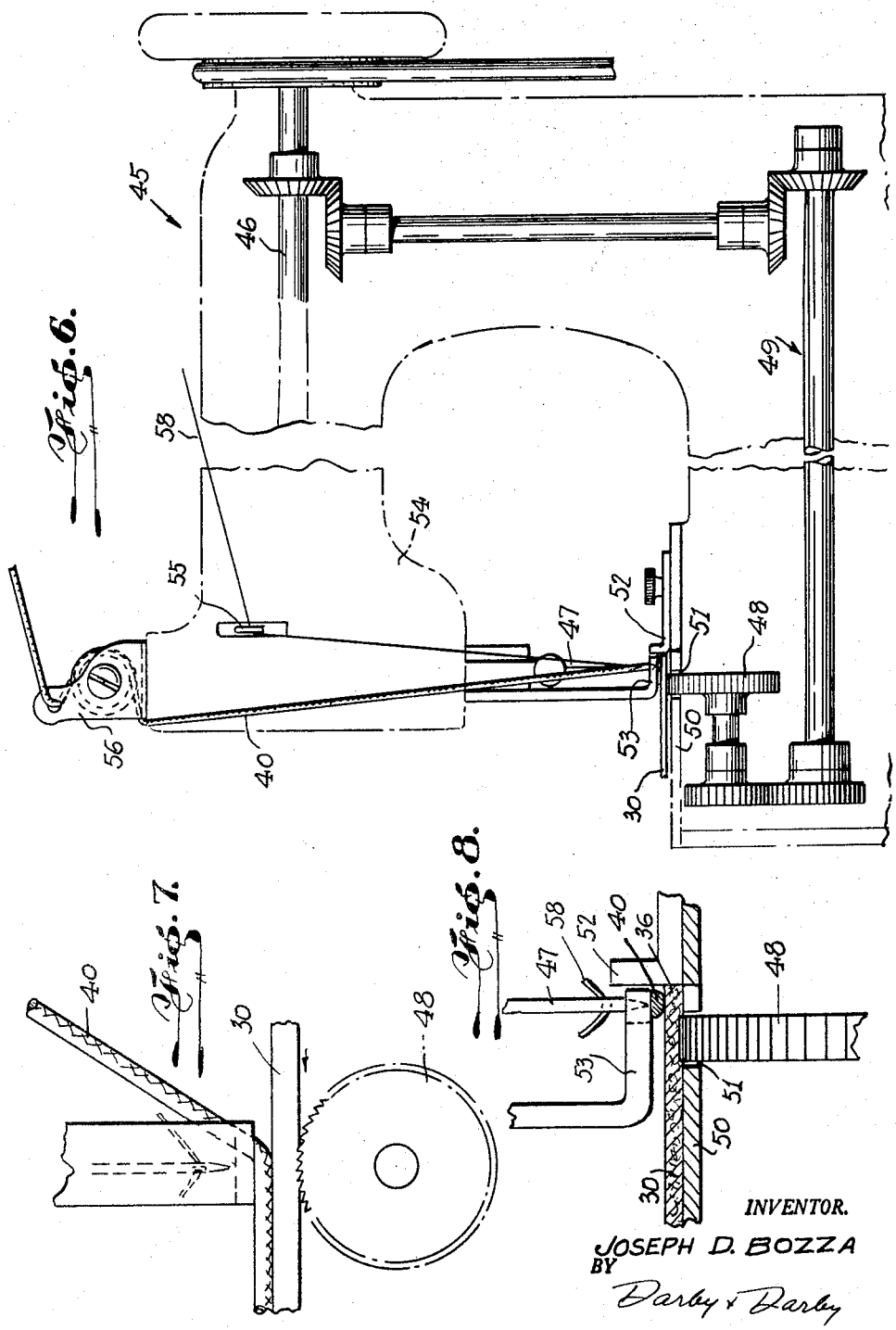

July 26, 1960  J. D. BOZZA  2,946,069
METHOD OF MANUFACTURING MOCCASINS
Filed Dec. 17, 1956  4 Sheets-Sheet 3
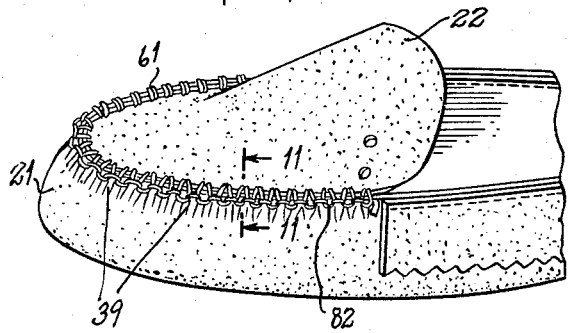
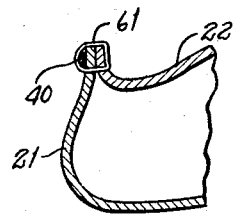
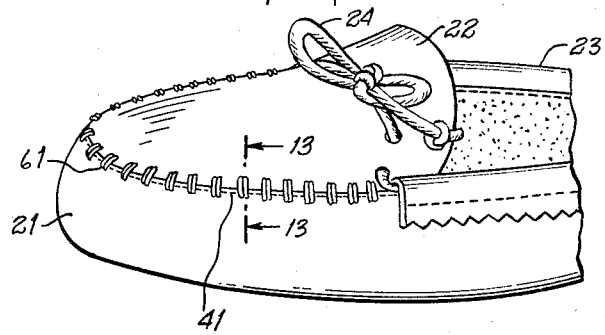
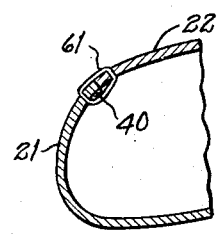
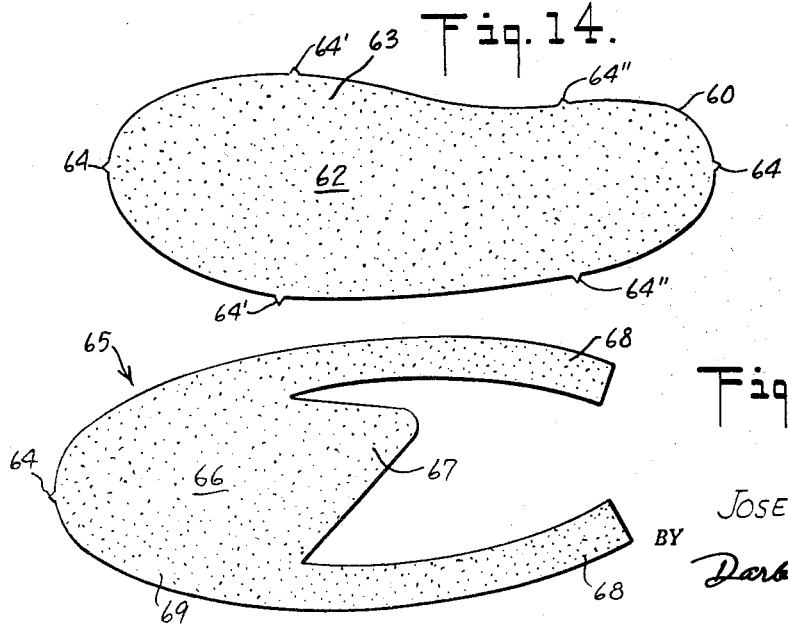
INVENTOR.
JOSEPH D. BOZZA
BY
Darby & Darby
ATTORNEYS July 26, 1960   J. D. BOZZA   2,946,069
METHOD OF MANUFACTURING MOCCASINS
Filed Dec. 17, 1956   4 Sheets-Sheet 4

INVENTOR.
JOSEPH D. BOZZA
BY Darby & Darby
ATTORNEYS

United States Patent Office 2,946,069
Patented July 26, 1960

2,946,069

METHOD OF MANUFACTURING MOCCASINS

Joseph D. Bozza, Jersey City, N.J., assignor to The Jo-An Shoe Manufacturing Co. Inc., Fair Lawn, N.J., a corporation of New Jersey Filed Dec. 17, 1956, Ser. No. 628,928

8 Claims. (Cl. 12—142)

The present invention relates generally to the manufacture of moccasin footwear and is particularly directed to manufacture of moccasin footwear having an improved vamp construction resulting from novel methods of manufacture. The present application is a continuation-in-part of my prior application Serial No. 391,458, filed November 12, 1953, for Method for Securing Together Moccasin Vamps and Plugs, which issued as Patent No. 2,774,087 on December 18, 1956.

Specifically, in one form, the invention relates to the manufacture of a true moccasin by novel means that not only completely eliminate the onerous handwork until now inherent, but do so at greatly reduced costs while yet enhancing the overall appearance of the shoe.

A true moccasin in which the sole and vamp portions are included in a single continuous piece of material brought together with an instep part or plug, has forever presented the problem of reducing the much greater peripheral length of the vamp piece down to coincide with the smaller peripheral length of the plug, so that the two can then be properly secured, thus forming the complete shoe.

Heretofore, this transformation was accomplished either by hand lacing, wherein the outer edge of the vamp was gathered, stitch by stitch, to the plug, or by means of various other ways known in the patented art, such as cementing the parts together to hold until sewing; molding the vamp piece with heat and pressure devices to force its perimeter to coincide with the line of the smaller plug; or, in a more recent patent, fastening the plug and vamp together by hand lacing as always but then stitching by machine underneath so that the original lacing margin could finally be trimmed off the top.

Other methods which have been employed to simulate the true moccasin effect are legion. One in particular takes notches out of the front line of the vamp, then sews together the open "V's" thusly drawing up the vamp to meet with the plug line. Another completely cuts out that part of the vamp piece which normally would become the sole in a genuine moccasin, and stitches in the plug first, since now the two lines will coincide, after which the sole is either sewed or cemented in place. These, of course, are only imitations.

The present invention, however, in one of its aspects, brings a true one-piece vamp and sole member to the proper size for exact juxtaposition with the plug in one simple sewing operation. The two parts are then fastened together with an overlapping type of machine stitch, which most neatly produces the effects of hand-sewing. When this shoe is completed it presents a much dressier, more uniform type of moccasin than ever possible by hand, and does so with great economies because of saving of time and reduction in required skill of the workman.

The present invention also relates to further improved methods of fabricating moccasin constructions having a greatly enhanced appearance and fit over conventionally produced moccasins, while retaining the advantages of simplicity and economy of machine manufacture. These further constructions are producible by adaptations and extensions of the method described and claimed in my said Patent No. 2,774,087.

According to one feature of the present invention, the sole piece and the upper piece (which may be or may include a plug piece or its equivalent) are first secured together in reverse relation, and thereafter turned inside out to place their edges in abutting relation to form an essentially smooth joint between the two pieces.

Other objects of the present invention will become apparent upon reading the following specification and referring to the accompanying drawings which form a material part of this disclosure.

The invention accordingly consists in the features of construction, combinations and arrangements of elements and method steps, which will be exemplified in the construction hereinafter described, and of which the scope will be indicated by the appended claims.

In the drawings:

Fig. 1 is a perspective view showing one form of true one-piece moccasin constructed in accordance with some of the features of the present invention.

Fig. 2 is a plan view showing a one-piece sole and vamp blank before assembly in the moccasin of Fig. 1.

Fig. 3 is a plan view showing a plug blank before assembly in the moccasin of Fig. 1.

Fig. 4 is a plan view showing the one-piece sole and vamp blank in Fig. 2 in an intermediate stage of manufacture.

Fig. 5 is an enlarged, fragmentary perspective view showing a detail of the construction of the moccasin of Fig. 1.

Fig. 6 is a front elevational view, partly broken away and partly in dot-and-dash outline, showing a sewing machine adapted for use in the practice of the present invention.

Fig. 7 is a fragmentary view of the sewing machine of Fig. 6 showing the manner of operating the latter in the practice of the present invention.

Fig. 8 is a fragmentary front elevational view of the elements shown in Fig. 7.

Fig. 9 is a fragmentary, greatly enlarged view showing in detail a feature of construction of one embodiment of the present invention.

Fig. 10 is a fragmentary perspective view of an intermediate stage of manufacture of a modification of the moccasin structure of Figs. 1–5 and 9, with a different manner of joining the plug to the one-piece sole and vamp blank.

Fig. 11 is a fragmentary view of a portion of the construction of Fig. 10, showing a cross-section of the seam thereof.

Fig. 12 is a fragmentary perspective view showing a true moccasin constructed in accordance with the modification of Figs. 10 and 11.

Fig. 13 is a fragmentary sectional view of the construction of Fig. 12 showing the seam thereof.

Fig. 14 is a plan view showing a one-piece lower blank for a further modified form of moccasin construction, the blank serving to form the sole and part of the vamp of the completed moccasin.

Fig. 15 is a plan view showing an upper blank to be used together with the blank of Fig. 14, and forming a portion of the vamp and the upper (including a plug piece) of the modified form of moccasin.

Figure 16:
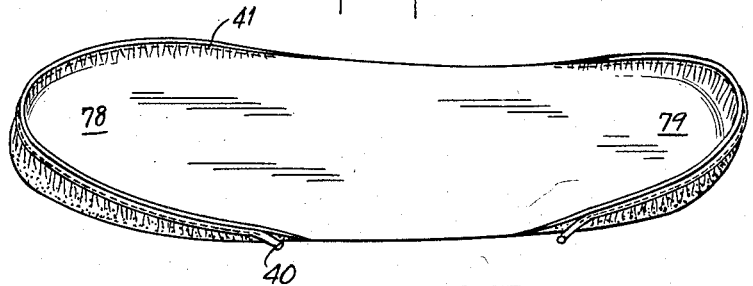
Fig. 16 is a top perspective view showing the blank of Fig. 14 in an intermediate stage of manufacture and before assembly in the completed moccasin.

Referring now more particularly to the drawings, the embodiment of the invention illustrated therein comprises a moccasin, generally designated 20, including a sole, a vamp or upper 21, a plug 22 secured in the fore part of the vamp, and a collar 23 extending along the edge of the vamp rearwardly of the plug 22 and enclosing the lace 24.

The vamp 21 is formed from the blank 30 which has a curved front portion 31 and a scalloped rear portion 32. The margin of the front portion 31 is adapted to be drawn up from the sole portion to form the moccasin vamp or upper 21, the rear portion 32 being laced or otherwise secured together to form the moccasin back. The fore part of plug 22 is then arranged with its diverging edges 33 and 34 and front curved edge 35 secured to the drawn-up front edges 36 and 37 of the vamp and sole blank 30, as by the stitching 38.

More particularly, the curved front edges 36 and 37 of the blank 30 are provided with a plurality of relatively minute, contiguous substantially uniform gathers or crimps 39, and a cord or tape 40 is secured along the gathered edges 36 and 37 by stitching 41, to permanently retain the curved front edges of the blank 30 in their gathered condition and the front margins of the blank drawn up.

The cord or tape 40 must be non-elastic, or inextensible, providing a maximum of restraining force.

In Figs. 6, 7 and 8 are illustrated the preferred manner of manufacturing the above described moccasin. A sewing machine, generally designated 45, includes a drive shaft 46 which is operatively connected to the sewing needle 47, and which is also operatively connected to the serrated or toothed feed roll or wheel 48 for driving the latter through the gear train, generally designated 49. The sewing machine 45 further comprises an operating table or working plate 50 having a through aperture 51 for receiving the upper portion of the feed wheel 48, and a work guide 52 adjustably mounted on the working plate 50. A presser foot 53 is disposed above the aperture 51 and feed wheel 48, and is adjustably mounted in the sewing machine arm 54. A thread loop is provided on the sewing machine arm 54, as at 55, and a suitable cord tensioning device 56 is also mounted on the sewing machine arm.

In practicing the present invention, the leather or other material being operated on, the blank 30 in this case, is arranged on the work table 50 with its edge 36 abutting the guide 52 so that the edge portion is disposed over the feed wheel 48 and beneath the presser foot 53. In the conventional manner, a thread 58 extends through the loop 55 and through the needle 47, the latter being vertically reciprocable through the presser foot 53. The usual bobbin, not shown, is under the table 50 to engage thread 58 to form the stitches. A cord or tape 40 extends through the tensioning device 56 and under the presser foot 53, which holds the cord in frictional engagement with the upper surface of the leather 30. Thus, the cord 40 extends between the presser foot 53 and the leather 30 and through the path of the needle 47.

In operation, the needle 47 reciprocates vertically and the feed wheel rotates in a counterclockwise direction, as seen in Fig. 7. The serrations or teeth of the feed roll 48 frictionally engage with the underside of the leather 30 to move the latter in the direction of the arrow. The presser foot 53 holds the cord or tape 40 firmly against the upper surface of the leather 30 in frictional engagement with the latter, so that the cord would normally be moved along with and is sewn to the leather. However, the cord is held back or restrained, preferably resiliently, by the tensioning device 56. As the feed roll 48 is positively driven, and as the teeth positively and frictionally engage with the leather 30, it will be apparent that the feed wheel teeth will serve to crimp or gather the more slowly moving leather 30. During this operation, the cord 40 is held taut by the tensioning device 56 and fixedly secured to the crimped or gathered leather 30 by the stitching action of the needle 47. Thus, upon removal of the leather 30 and its attached cord or tape 40, it is seen that the edge portion of the leather will be permanently retained in its gathered or crimped condition by the attached cord.

Further, the above described crimping or gathering action will serve to draw up the marginal portion of the originally flat blank 30 so as to properly form the upper toe portion of the moccasin as a pocket. If it is desired to vary the amount of crimping or gathering effected by the above described operation, and hence the degree of drawing up of the marginal portion of the blank 30, it is only necessary to increase or decrease the tension under which the cord 40 is held during the stitching process. That is, with the cord 40 under greater tension, the retardation of the leather 30 will be increased and thereby effect increased gathering or crimping action to deepen the hollow pocket. Conversely, when the cord tension is decreased, the gathering action and the degree of marginal drawing up will be decreased.

The desired amount of drawing up is determined by the peripheral length of the plug 22 so that the edges 33, 34, and 35 of the latter will just fit within the reduced periphery formed by the drawn-up edges 36 and 37 of the blank 30. The plug may then be stitched into place by an overlapping stitch sewing machine (also sometimes called an over-edge sewing machine) or other suitable means, preferably to simulate hand stitching, after which the collar 23 is attached, and the back of the shoe is closed in any desired manner.

Referring to Figs. 10–13, the present invention also includes a modified form of construction and method of fabrication, in which by minor changes in steps from the method described above, a genuine moccasin is formed without the ridged seam extending around the plug as in the case of the embodiment shown in Fig. 1.

The method followed to form this modified construction starts with the blanks of Figs. 2 and 3, the one-piece sole and vamp blank of Fig. 2 being gathered together at its toe end and sewn to the cord as described above and shown in Fig. 4. The present modification resides in the manner in which the plug blank of Fig. 3 is assembled to the sole and vamp blank of Fig. 4.

In this modified construction, the processed blank of Fig. 4 is assembled with and sewn to the plug blank 22 in the same manner as in Fig. 1 but in an inside-out condition: that is, the cord 40 is on the outer face of the pocket 29 formed in the toe portion of the blank 30, and the plug 22 is placed within the pocket formed in the vamp blank 30, with its inside surface facing outwardly and with the edges 33 and 34 of the plug 22 and its front edge 35 placed flat against and aligned with the front edges 36 and 37 of the sole and vamp blank 30. In this position what will ultimately become the outwardly facing surfaces of the plug, sole and vamp are flat together in juxtaposition. In this position the vamp and plug are sewn together in a conventional simple overlapping or over-edge type of sewing machine, such as Singer Model 176–34 machine. The resultant intermediate stage of the manufacture thus obtained is illustrated in Figs. 10 and 11. Each stitch then has a single thread running through the vamp and plug pieces, and the locking loop 82 of each stitch is then preferably located on the side where the cord 40 is located. This unfinished product is then turned inside out. In so doing, the stitches finally appearing on the outside will then appear as short straight threads 61 extending substantially vertically and in parallel spaced relation around the sewn periphery of the plug.

In addition, by suitably selecting the tightness of stitching, the edges of the vamp and plug can be made to abut rather than to overlap or be parallel, so that the plug forms a smooth continuation of the vamp and is joined thereto by the stitches 61, shown in Figs. 12 and 13.

The stitches 61 can thus be made part of the decorative aspect of the moccasin. The plug 22 and the vamp 21 may be made of contrasting materials or colors, and the stitches may be made to contrast with the materials of the plug and vamp so as to add a decorative aspect to the moccasin.

The moccasin of Fig. 12 is then finished in the same manner as shown in Fig. 1, with a collar 24 extending around the remaining portion of the vamp 21 to which the plug 22 is not sewn. A lace 24, not shown, may be added.

In moccasins of the type described above, the vamp along the side of the foot, particularly at the arch of the foot, is formed of the same piece of material as the sole. This material while flexible, is not elastic, and accordingly cannot conform well to the foot, particularly around the arch and the side of the foot. Accordingly, in conventional moccasins as well as in the moccasins described above, there is no close conformity between the moccasin and the foot at the arch or side of the foot intermediate the toe and heel portions.

The further modified construction shown in Figs. 14 through 19 overcomes this, and provides a construction which conforms more closely to the foot while permitting further decorative aspects to be added or included. It further contributes a "swivel action" which maintains the moccasin in better conformity with the foot during walking.

In this modified construction, a line of stitching similar to that shown at 61 in Fig. 12, is utilized not only around the part of the moccasin corresponding to the junction between the plug and the vamp but also completely around the sides and back. In effect, the regular vamp and upper is separated horizontally into two sections, one above the other. For this purpose only the lower part of the vamp and upper is integral with the sole. The upper part of the vamp is integral with the plug and is continued integrally around the back and sides of the moccasin as part of the upper. Nevertheless, since the sole is integral with the lower vamp portion and with the lower part of the shoe upper, the genuine moccasin construction is retained. This will be more clearly apparent from Figs. 14 and 15 which show respectively the flat sole blank and the flat upper blank.

The flat sole blank 60 generally conforms to the outline of the foot or the impression of a foot on a flat surface. The center portion 62 forms the sole of the completed moccasin while the periphery 63 forms part of the lower portion of the vamp and upper as will be described. Locating tips or points 64 may be formed in each blank 60 or 65 to assist in the further steps of fabrication.

The upper blank, 65, shown in Fig. 15 includes a front-central portion 66 serving the same function as the plug of the previous construction. This plug portion 66 is nearly surrounded by a peripheral portion 69 forming the upper part of the vamp of the completed moccasin. The tongue portion 67 is contiguous with the plug portion 66, and a pair of strips or tabs 68 extending backwardly from the peripheral vamp portion 69. These strips 68 form part of the upper of the completed moccasin.

The blank of Fig. 14 is processed in a manner similar to that shown in Fig. 4 and described above to form a pocket around the toe portion between the two locating points 64' and to form a second similar pocket between the two locating points 64" of the heel portion. This is shown in Fig. 16, showing the toe pocket 78 and the heel pocket 79 formed in the sole blank 60. As in the case of Fig. 4, the cord 40 is sewn near the peripheral edge of each of the pockets 78 and 79 to retain it in position.

Figure 17:
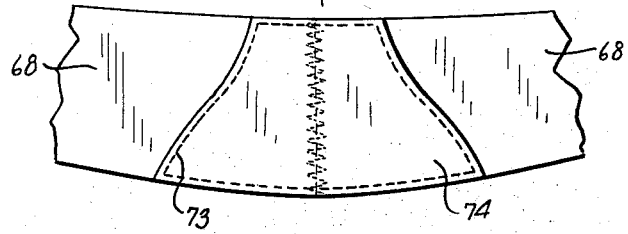
Fig. 17 is a fragmentary view of a portion of the blank of Fig. 15 in an intermediate stage of manufacture and before assembly in the completed moccasin.

The upper blank 65 first has the ends of its strips 68 sewn together in abutted fashion by conventional zig-zag stitching 73, as shown in Fig. 17, and this seam is then reenforced by a reenforcing piece 74 sewn to both strips 68 and illustrated again in Fig. 17. In this way the back is closed.

Figure 18:
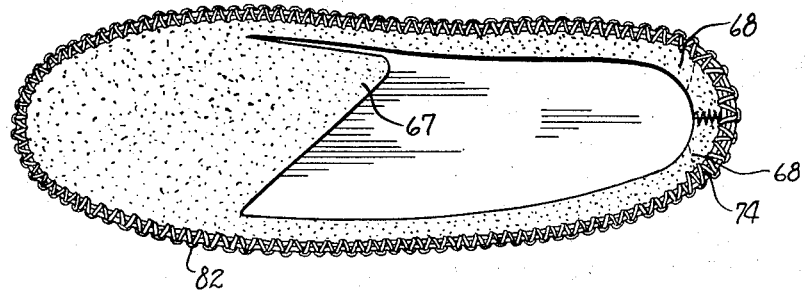
Fig. 18 is a top view of the blanks of Figs. 16 and 17 sewn together in an intermediate stage of manufacture.
Figure 19:
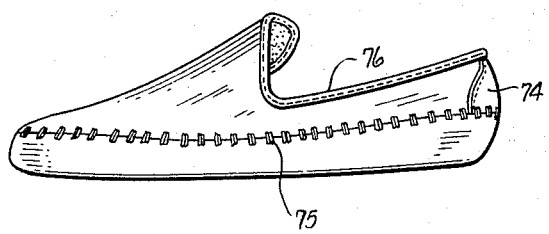
Fig. 19 is a side view of the complete modified moccasin construction according to Figs. 14–18.

The two operations illustrated in Figs. 16 and 17 are designed so that the periphery of the partially formed blank 60 of Fig. 16 is equal to that of the partially formed blank 65 of Fig. 17. These two partially formed blanks are then juxtaposed with their edges aligned and with what will be their outer surfaces flat against one another. In effect the blank 65 of Fig. 17 is placed inside the blank 60 of Fig. 16 with their edges aligned and their surfaces in contact. The two blanks are then sewn together about their complete periphery in the same manner as described with respect to Fig. 10 with an over-edge or overlapping stitch. The article thus formed is shown in Fig. 18. It is then turned inside out and the edges of the two blanks are made to abut one another so that the upper blank forms a smooth continuation of the sole blank as seen in Fig. 19. The blanks are so cut that the line of stitching 75, as shown in Fig. 18, extends completely around the entire side of the foot, and preferably uniformly spaced above the sole, so that an ornamental row of parallel stitching as shown in Fig. 19 appears completely encircling the moccasin.

Because of the fact that part of the vamp is integral with the sole blank, and part is formed of the upper blanks by suitably shaping or designing the shapes of the edges of the blank, the moccasin may be made to conform more closely to the arch and side of the foot intermediate the toe and sole portions than was formerly the case when the vamp and sole were one piece. As a result a better fitting and better appearing article of footwear is produced while preserving all the advantages and desirable appearance of the genuine moccasin, since the sole is integral with the vamp. In addition, the line of stitching provides a hinging or swiveling action between the two pieces of the moccasin, which causes the moccasin to remain in better relation with the foot during flexure in wearing and walking.

To finish off the remaining cut edges of the upper blank a suitable edging 76 may be sewn completely around the aperture formed by the upper part of the blank and the top. Socklinings, innersoles, outersoles and heels may be attached as desired. This article of footwear therefore not only lends itself to the simple processes and steps described above, requiring no handstitching whatever, but in addition provides a better fitting moccasin which can be fabricated for style in two-tone effects and with a desirable ornamental appearance.

It will be understood that the novel features of the present invention may be employed in connection with genuine moccasins with or without hard soles, such construction being omitted from the drawings for purposes of clarity.

From the foregoing, it is seen that the present invention fully accomplishes its intended objects, and provides a construction and method of manufacture which are well adapted to meet practical conditions of use.

Although the present invention has been described in some detail by way of illustration and example for purposes of clarity of understanding, it is understood that certain changes and modifications may be made within the spirit of the invention and the scope of the appended claims.

What is claimed is:

1. The method of manufacturing footwear from a first relatively highly flexible piece having a sole portion and a portion extending upwardly therefrom to form part of an upper, and from a second piece providing a further part of said upper, said method comprising the steps of forming a toe pocket in said first piece with the ultimately inside surface of said pocket facing outwardly, securing said second piece to said first piece about the periphery of said pocket with the respective edges of said pieces in contiguous edge-to-edge alignment under tension appropriate to permit said pieces being turned into edge-abutting relationship and with said second piece having its ultimately outside surface in face-to-face relationship with the ultimately outside surface of said first piece, and turning the article thus made inside out to place said pieces in said edge-abutting relationship.

2. The method of manufacturing footwear as in claim 1, wherein said step of forming said pocket comprises forming a plurality of contiguous substantially uniform gathers along the edge of said first piece in the toe region thereof, and retaining said gathers by securing a substantially inelastic cord along one face of said first piece edge and wherein said step of securing said second piece to said first piece comprises sewing said piece together by stitches at least partially encompassing said inelastic cord.

3. The method as in claim 2, wherein said retaining step comprises stitching said cord continuously along said gathered edge.

4. The method of claim 1, wherein the step of securing said second piece to said first piece is performed by sewing through both said pieces with an over-edge stitch.

5. The method of manufacturing footwear from a flexible first piece having a sole portion and an integral portion extending upwardly therefrom and entirely therearound to form part of an upper and from a second piece providing a further part of said upper extending entirely around said footwear, said method comprising the steps of forming a toe pocket and a heel pocket in said first piece with the ultimately inside surface of said pockets facing outwardly, securing said second piece to said first piece by stitching about the entire periphery of said first piece with an overedge stitch with the respective edge of said pieces in contiguous edge-to-edge alignment under tension appropriate to permit said pieces being turned into edge-abutting relationship and with said second piece having its ultimately outside surface in face-to-face relationship with the ultimately outside surface of said first piece, and turning the article thus made inside out to place said pieces in said edge-abutting relationship with each of said pieces forming a substantially smooth continuation of the other while permitting both said pieces substantially separately to conform to movements of the foot of the wearer by hinging action of said stitching.

6. The method of manufacturing footwear from a first relatively highly flexible piece having a sole portion and a portion extending upwardly therefrom to form a part of an upper, and from a second piece providing a further part of said upper, said method comprising the steps of forming a toe pocket in said first piece with the ultimately inside surface of said pocket facing outwardly, sewing said second piece to said first piece about the periphery of said pocket with the respective edges of said pieces in contiguous edge-to-edge alignment and with said second piece having its ultimately outside surface in face-to-face relationship with the ultimately outside surface of said first piece and with a stitch having locking loops on the then outside of said pieces and under tension appropriate to permit said pieces being turned into edge-abutting relationship, and turning the article thus made inside out to place said pieces in said edge-abutting relationship with said locking loops on the interior of said article.

7. The method of manufacturing footwear from a first relatively highly flexible piece having a sole portion and a portion extending upwardly therefrom to form part of an upper, and from a second piece providing a further part of said upper, said method comprising the steps of forming a toe pocket in said first piece with the ultimately inside surface of said pocket facing outwardly, placing said second piece against said first piece with the respective edges of said pieces in contiguous edge-to-edge alignment and with said second piece having its ultimately outside surface in face-to-face relationship with the ultimately outside surface of said first piece, sewing said second piece to said thusly placed first piece about the periphery of said pocket with a type of stitch having locking loops on the then outside of said pieces and with a tension appropriate to permit said pieces being turned into edge-abutting relationship, and turning the article thus made inside out to place said pieces in said edge-abutting relationship with said locking loops on the interior of said article.

8. The method of manufacturing footwear from a first relatively highly flexible piece having a sole portion and a portion extending upwardly therefrom to form part of an upper, and from a second piece providing a further part of said upper, said method comprising the steps of forming a toe pocket in said first piece with the ultimately inside surface of said pocket facing outwardly, said step including forming a plurality of gathers along the edge of said first piece in the toe region thereof and retaining said gathers by securing a substantially inelastic cord along the ultimately inside surface of said first piece adjacent the edge thereof, placing said second piece against said first piece with the respective edges of said pieces in contiguous edge-to-edge alignment and with said second piece having its ultimately outside surface in face-to-face relationship with the ultimately outside surface of said first piece, sewing said second piece to said thusly placed first piece about the periphery of said pocket with an overlapping stitch at least partially encompassing said cord and having locking loops on the then outside of said pieces and with a tension appropriate to permit said pieces being turned into edge-abutting relationship, and turning the article thus made inside out to place said pieces in said edge-abutting relationship with said locking loops and said cord on the interior of said article.

References Cited in the file of this patent

UNITED STATES PATENTS

| | | |
|---|---|---|
| 910,677 | Hanson et al. | Jan. 26, 1909 |
| 1,052,133 | Curtin et al. | Feb. 4, 1913 |
| 1,968,012 | Boghosian | July 31, 1934 |
| 2,415,004 | Feldhake | Jan. 28, 1947 |
| 2,448,287 | Abrams | Aug. 31, 1948 |
| 2,472,265 | Phillips | June 7, 1949 |
| 2,537,602 | Potvin | Jan. 9, 1951 |
| 2,564,301 | Dolan | Aug. 14, 1951 |
| 2,774,087 | Bozza | Dec. 18, 1956 |

FOREIGN PATENTS

| | | |
|---|---|---|
| 7,882 | Australia | Feb. 23, 1933 |
| 316,659 | Italy | Apr. 12, 1934 |
| 365,641 | Great Britain | Jan. 25, 1932 |
| 477,195 | Great Britain | Dec. 23, 1937 |